(12) United States Patent
Apblett

(10) Patent No.: US 9,301,542 B1
(45) Date of Patent: Apr. 5, 2016

(54) RECYCLABLE HIGH CAPACITY SELECTIVE SORBANT FOR HEAVY METALS, RADIONUCLIDES, AND ACTINIDES

(71) Applicant: The Board of Regents for Oklahoma State University, Stillwater, OK (US)

(72) Inventor: Allen Wallace Apblett, Stillwater, OK (US)

(73) Assignee: The Board of Regents for Oklahoma State University, Stillwater, OK (US)

( * ) Notice: Subject to any disclaimer, the term of this patent is extended or adjusted under 35 U.S.C. 154(b) by 0 days.

(21) Appl. No.: 13/954,782

(22) Filed: Jul. 30, 2013

Related U.S. Application Data

(60) Provisional application No. 61/677,327, filed on Jul. 30, 2012.

(51) Int. Cl.
*A23P 1/00* (2006.01)
*A23L 2/78* (2006.01)
*C02F 1/42* (2006.01)

(52) U.S. Cl.
CPC .... *A23L 2/78* (2013.01); *C02F 1/42* (2013.01)

(58) Field of Classification Search
CPC ..... A23L 2/60; C02F 2302/18; C02F 210/20; C02F 2307/02
USPC ........................................ 426/495
See application file for complete search history.

(56) References Cited

U.S. PATENT DOCUMENTS

| 2,872,394 | A | * | 2/1959 | Newnam | C25C 1/22 205/48 |
| 2,886,427 | A | * | 5/1959 | Martin et al. | 75/773 |
| 5,861,055 | A | * | 1/1999 | Allman | C09G 1/02 106/11 |
| 2002/0136809 | A1 | * | 9/2002 | Shin | A23C 9/1522 426/317 |
| 2011/0297874 | A1 | * | 12/2011 | Han | 252/175 |

OTHER PUBLICATIONS

Apblett: Nanotechnology for the prevention of food and agriculture contamination as a result of nuclear accidents; Oral Session: Nanotechnology for Food and Agriculture; 243rd ACS National Meeting & Exposition, Mar. 25-29, 2012, San Diego, California.*
Halford: Removing Radioactivity: ACS Meeting News: Nanoparticles strip radioactive strontium and other heavy metals from beverages; C&EN, Web Date: Mar. 28, 2012.*
Apblett: Nanotechnology for removal of heavy metals and radionuclides from foodstuffs; Abstracts of Papers, 239th ACS National Meeting, San Francisco, CA, United States, Mar. 21-25, 2010, AGFD-253. | Language: English, Database: Caplus.*
SenGupta: Ion Exchange Technology: Advances in Pollution Control; CRC Press, Jun 15, 1995—Nature—385 pages.*
Apblett: Adsorption and Separation of Uranium Using Tungsten Oxides; Environmental Issues and Waste Management Technologies in the Materials and Nuclear Industries XII; copyright 2009.*

* cited by examiner

*Primary Examiner* — Patricia George
(74) *Attorney, Agent, or Firm* — Fellers, Snider, Blankenship, Bailey & Tippens, P.C.; Terry L. Watt

(57) ABSTRACT

Tungstates for use in removal of heavy metals, radionuclides, actinides and other contaminants is disclosed.

20 Claims, No Drawings

RECYCLABLE HIGH CAPACITY SELECTIVE SORBANT FOR HEAVY METALS, RADIONUCLIDES, AND ACTINIDES

This application claims the benefit of U.S. Provisional Patent Application Ser. No. 61/677,327 filed on Jul. 30, 2012 and incorporates said provisional application by reference into this document as if fully set out at this point.

FIELD OF THE INVENTION

This disclosure relates to removal of undesirable chemical substances or contaminates in general and, more specifically, to removal by selective sorbancy.

BACKGROUND OF THE INVENTION

Heavy metals, radionuclides, and actinides are known to be present as contaminants in products such as drinking water, various juices, milk, and other food products. These contaminates must be mitigated or removed down to acceptable levels in order for the products to be safely consumed.

What is needed is a method of addressing the above and related concerns.

SUMMARY OF THE INVENTION

The invention of the present disclosure, in one aspect thereof, comprises a method including preparing a first tungstate using a predetermined metal, exposing a contaminated source to the first tungstate, allowing sufficient time for the contaminant to replace the predetermined metal to form a second tungstate; and removing the second tungstate from the liquid.

The method may include loading the tungstate onto silica pellets or onto aluminum oxide pellets or other high surface area support devices. Exposing the first tungstate to a contaminated source may comprise loading the first tungstate into a capsule and introducing the capsule into the contaminated liquid source. In some embodiments, the method includes separating tungstate ions from the adsorbed contaminant.

In some embodiments, the predetermined metal comprises calcium. In other embodiments, the predetermined metal comprises magnesium. The contaminant may be a heavy metal, a radionuclide, or an actinide. The contaminated source may be a water source or a food source.

The invention of the present disclosure, in another aspect thereof, comprises a method including preparing a supply of calcium tungstate, introducing the supply of calcium tungstate into a contaminated liquid, allowing a sufficient time to pass for the calcium tungstate to adsorb contaminants from the contaminated liquid, and removing the calcium tungstate from the liquid.

Preparing a supply of calcium tungstate further may comprise preparing a supply of calcium tungstate in the form of high surface area pellets or preparing capsules containing calcium tungstate. In some embodiments, the method includes recycling the tungstate ions from the adsorbed contaminants, and/or separating the removed contaminants from the calcium tungstate. Introducing the supply of calcium tungstate into a contaminated liquid may further comprise introducing the supply of calcium tungstate into a water supply contaminated with a heavy metal or into a food product.

The invention of the present disclosure, in another aspect thereof comprises a method including preparing calcium tungstate with a delivery device, introducing the delivery device into a contaminated liquid, allowing sufficient time for the calcium tungstate to adsorb a quantity of contaminants from the contaminated liquid, and removing the delivery device from the liquid.

DETAILED DESCRIPTION OF THE PREFERRED EMBODIMENTS

The present disclosure provides various methods for removal of contaminants from specific types of liquids. For purposes of the present disclosure, a contaminant is a substance that will form a tungstate. Such contaminants include, for example, heavy metals, radionuclides, and actinides. The contaminants may be present in a liquid or other source such as drinking water, waste water. milk, juice, or other food products.

In various embodiments, a contaminated source is exposed to a metal tungstate. A tungstate having a lighter metallic component will exchange its metal with the heavier contaminant metal (in this context, lighter and heavier referring to the atomic weight). Thus the contaminant metal may be removed as a newly formed tungstate. Such a process of exchange may be referred to throughout this disclosure as an adsorption or absorption reaction. The metal chosen for the initial tungstate used as a decontaminant may be selected from those metals which are lighter than the target contaminant. The metal initially used may also be selected to be stable in aqueous environments. The metal may also be chosen from those that are not particularly harmful in food supplies—especially where it is a food product that is being decontaminated. In many embodiments, the metal chosen for the initial tungstate is an alkali earth metal, particularly magnesium or calcium. Magnesium and calcium are not particularly harmful (and may, in fact, be beneficial) in a food supply in an amount that would normally be leftover from a decontamination reaction. However, it is also understood that the metal leftover after decontamination could, itself, be removed in a later process.

This disclosure results in part from an investigation of the uptake of actinides and heavy metals by calcium tungstate. Such a process produces corresponding metal tungstates by an ion exchange reaction. Calcium tungstate absorbs the heavier metals from water and replaces them with calcium. Equation 1, below, corresponds to one embodiment of a method of the present disclosure for working with divalent metals (although the process is not limited to these metals):

$$M^{2+} + CaWO_4 \rightarrow Ca^{2+} + MWO_4 \qquad (eq. 1)$$

where M=Pb, Cd, $H_g$, Sr, $UO_2$, etc.

One advantage this process provides is it is very easy to separate the metals from the "MWO4" product. Treatment with a base produces the metal hydroxides as solids while the tungstate is dissolved. The resulting solution can readily be used to prepare fresh calcium tungstate, thus recycling the tungstate. Recovery of tungsten is over 98% efficient.

Calcium tungstate may be synthesized both in a powder form and on high surface area silica pellets to enhance rates of reaction. One method of preparing pellets comprises dissolving 10 mmols of $Na_2WO_4 * 2H_2O$ that in 100 mL of deionized water. This solution is vacuum impregnated into alumina catalyst support pellets and the pellets remained immersed in the impregnation solution for 24 hrs. The excess solution is decanted off and the pellets are rinsed quickly with 100 mL deionized $H_2O$. After the rinse, the pellets are placed under vacuum and a 100 mL solution of 10 mmol $CaCl_2$ is vacuum impregnated into the pellets. After 24 hours, the pellets may be rinsed and dried under vacuum. The amount of $CaWO_4$ loaded on the pellets can be varied by changing the concentration of the reactants. It will also be appreciated that the method just described is suitable for preparation of small batches of pellets for use in a laboratory environment. The process can easily be scaled up as needed by one having ordinary skill in the art.

In another method of preparing the pellets a calcium tungstate precursor is prepared by dissolving 10 mmol of calcium gluconate, $Ca(C_6H_{11}O_7)_2$, in 100 mL of $H_2O$ and reacted with 10 mmol $H_2WO_4$ under reflux conditions for 24 hrs. The resultant brown solution may be used to vacuum impregnate $Al_2O_3$ high surface area pellets for 24 hrs. The pellets are then rinsed and dried under vacuum. Once dry, they may be heated to the precursor's decomposition temperature of approximately 650° C., yielding $CaWO_4$ supported on the alumina pellets.

Highlighting the efficacy of the selective sorbancy of calcium tungstate, a 1000 ppm $Pb(NO_3)_2$ was treated with $CaWO_4$. The lead was reduced below the detection limit of an 1 ppb. In another example, a similar result was achieved for uranyl nitrate. In yet another example, treatment of milk with excess $CaWO_4$ reduced the strontium content of the milk from of 852 ppb to below the detection limit of 6 ppb within 24 hrs. $CaWO_4$ has also been used in experiments to remove cobalt, copper, manganese, and uranyl. Visible signs that remediation occurred were observed in a change in color of the solid reagent to that of the metal ions It will be appreciated that various embodiments of the processes of the present disclosure may be utilized for multiple purposes. Non-limiting examples include: purification of drinking water containing heavy metals or uranium; barrier materials for prevention of spread of contaminated water; treatment of acid mine drainage; "mining" of ground water or seawater for metals; actinide separations possibly in ore refining or fuel rod reprocessing; and substituting $MgWO_4$ for $CaWO_4$ and purifying magnesium salts for food, medical, and mineral supplements.

In an example of purifying a food product, Grape juice (224 g) containing 52 ppb of lead was treated with 1.0 g of 14% $CaWO_4$ supported on $Al_2O_3$. Within 30 minutes the concentration of lead in the juice was reduced to 0.41 ppb. A magnesium containing brine (26 ml) that was contaminated with 126 ppm of calcium was treated with 0.1 g of $MgWO_4$. The amount of calcium present in the brine was reduced to 106 ppm and the $MgWO_4$ was converted to $CaWO_4$. Use of a larger amount of $MgWO_4$ (0.5 g) removed the calcium to below the detection limit of 0.20 ppm.

Compared to other methods of metal removal, purification, or isolation the methods of the present disclosure have the advantages of extremely high sorption capacity, very high selectivity, and easy recycling in a green process that only produces a harmless salt or fertilizer as a by-product.

In addition to the pelletized delivery devices discussed above, in another embodiment, calcium tungstate may be incorporated into a capsule or other delivery device or mechanism that may be placed in liquid to be purified (e.g., milk, water, juices, etc.). Such capsules may be provided directly to consumers for use. Upon placing the capsule or capsules into a container of contaminated liquid, the liquid may either be left unstirred, or it may be agitated or stirred to allow the more rapid removal of metals or other contaminants. The capsules may retain the contaminants and be removed from the liquid to be discarded or recycled.

In one example, calcium tungstate coated on silica pellets was placed in a commercially available tea ball and used to remove lead from a glass of grape juice. Within 5 minutes the lead concentration was reduced from 1.9 ppb to an undetectable level. No change in juice quality or chemistry was observed except for a minute increase in calcium content (0.4 ppb).

In some cases (e.g. removal of contaminants from calcium chloride) the tungstate may be applied as a soluble salt that forms a precipitate with the contaminant metals. For example, in one experiment, addition of sodium tungstate caused the precipitation of calcium tungstate that is significantly enriched in lead. The concentration of lead remaining in solution in such cases may be so low as to be undetectable.

Upon the completion of the cleaning process, the removed metal ions may be recovered and the adsorbant recycled. The metal ions may be separated from the tungstate by treatment with either an aqueous solution of an alkali or one of an alkali metal carbonate. This produces a precipitate of the captured metal ions as either insoluble hydroxide or carbonate salts and a solution of tungstate ions. The latter can then be used to directly produce more calcium tungstate by a precipitation reaction, or can be acidified and utilized to produce calcium tungstate single-source precursors In one example of the recovery process described above, refluxing of 3.35 g $SrWO_4$ with 100 ml of 0.12 M sodium carbonate produced 1.46 g of solid strontium carbonate (a 98.9% recovery of strontium). In another example, reaction of 5.18 g $UO_2WO_4$ with excess concentrated ammonium hydroxide produce solid $(NH_4)_2U_2O_7$ in a 96.7% yield. In another example, $PbWO_4$ gave a quantitative yield of a white precipitate of $Pb(OH)_2$ when refluxed with a sodium hydroxide solution. Tungstate was recovered from the resulting $Na_2WO_4$ solution by adding nitric acid to product yellow tungstic acid. The tungstic acid was recovered in a yield of 98%.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A method comprising:
 preparing a first tungstate using a predetermined metal;
 exposing a source containing a contaminant to the first tungstate;
 allowing sufficient time for the contaminant to replace the predetermined metal to form a second tungstate; and
 removing the second tungstate from the source.

2. The method of claim 1, further comprising loading the first tungstate onto silica pellets.

3. The method of claim 1, further comprising loading the first tungstate on aluminum oxide pellets.

4. The method of claim 1, wherein exposing the source to the first tungstate comprises loading the first tungstate into a capsule and introducing the capsule into the source.

5. The method of claim 1, further comprising separating tungstate ions from an adsorbed contaminant.

6. The method of claim 1, wherein the predetermined metal is calcium.

7. The method of claim 1, wherein the predetermined metal is magnesium.

8. The method of claim 1, wherein the contaminant is a heavy metal.

9. The method of claim 1, wherein the contaminant is a radionuclide.

10. The method of claim 1, wherein the contaminant is an actinide.

11. The method of claim 1, wherein the source is a water source.

12. The method of claim 1, wherein the source is a food source.

13. A method comprising:
preparing a supply of calcium tungstate;
exposing a liquid containing a contaminant to the supply of calcium tungstate;
allowing a sufficient time to pass for the calcium tungstate to adsorb contaminants from the liquid; and
removing the calcium tungstate from the liquid.

14. The method of claim 13, wherein preparing the supply of calcium tungstate further comprises preparing a supply of calcium tungstate in the form of high surface area pellets.

15. The method of claim 13, wherein preparing the supply of calcium tungstate further comprises preparing capsules containing calcium tungstate.

16. The method of claim 13, further comprising recycling tungstate ions from the adsorbed contaminants.

17. The method of claim 13, further comprising separating removed contaminants from the calcium tungstate.

18. The method of claim 13, wherein introducing the supply of calcium tungstate into a contaminated liquid further comprises introducing the supply of calcium tungstate into a water supply contaminated with a heavy metal.

19. The method of claim 13, wherein introducing the supply of calcium tungstate into a contaminated liquid further comprises introducing the supply of calcium tungstate into a food product.

20. A method comprising:
preparing a delivery device comprising calcium tungstate;
exposing a liquid containing a contaminant to the delivery device;
allowing sufficient time for the calcium tungstate to adsorb a quantity of contaminants from the contaminated liquid; and
removing the delivery device from the liquid.

\* \* \* \* \*